US010067772B1

(12) United States Patent
Ledet

(10) Patent No.: US 10,067,772 B1
(45) Date of Patent: Sep. 4, 2018

(54) SECURITY-BASED MESSAGE MANAGEMENT

(71) Applicant: Open Invention Network LLC, Durham, NC (US)

(72) Inventor: David Gerard Ledet, Allen, TX (US)

(73) Assignee: Open Invention Network, LLC, Durham, NC (US)

( * ) Notice: Subject to any disclaimer, the term of this patent is extended or adjusted under 35 U.S.C. 154(b) by 292 days.

(21) Appl. No.: 14/837,444

(22) Filed: Aug. 27, 2015

Related U.S. Application Data

(60) Provisional application No. 62/114,152, filed on Feb. 10, 2015.

(51) Int. Cl.
    *G06F 21/60* (2013.01)
    *G06F 9/445* (2018.01)

(52) U.S. Cl.
    CPC ........ *G06F 9/44505* (2013.01); *G06F 21/604* (2013.01)

(58) Field of Classification Search
    CPC ........ H04L 63/10; H04L 63/102; G06F 21/30
    USPC .................... 726/1–6; 713/155–156
    See application file for complete search history.

(56) References Cited

U.S. PATENT DOCUMENTS

| | | | | |
|---|---|---|---|---|
| 9,574,671 | B1* | 2/2017 | Amberg | H04W 64/00 |
| 9,582,139 | B1* | 2/2017 | Tseng | G06F 3/04812 |
| 2013/0139222 | A1* | 5/2013 | Kirillin | H04L 67/02 |
| | | | | 726/4 |
| 2013/0254837 | A1* | 9/2013 | Brannon | G06F 21/60 |
| | | | | 726/1 |
| 2013/0312057 | A1* | 11/2013 | Dabbiere | G06F 21/60 |
| | | | | 726/1 |
| 2014/0258711 | A1* | 9/2014 | Brannon | H04L 63/0823 |
| | | | | 713/156 |
| 2014/0289511 | A1* | 9/2014 | Tuch | H04L 63/0823 |
| | | | | 713/156 |
| 2014/0330944 | A1* | 11/2014 | Dabbiere | H04L 63/108 |
| | | | | 709/220 |
| 2015/0082371 | A1* | 3/2015 | DeWeese | H04L 63/10 |
| | | | | 726/1 |
| 2015/0128205 | A1* | 5/2015 | Mahaffey | H04L 63/20 |
| | | | | 726/1 |
| 2015/0379247 | A1* | 12/2015 | Makofsky | G06F 21/36 |
| | | | | 726/7 |
| 2016/0026776 | A1* | 1/2016 | Hurst | G06F 21/602 |
| | | | | 713/165 |

* cited by examiner

*Primary Examiner* — Morshed Mehedi
*Assistant Examiner* — Viral S Lakhia

(57) ABSTRACT

Bring Your Own Device (BYOD) functionality may allow a user of a client device to utilize the device in a business environment where the functionality of the device is altered to conform to the business environment via a business profile. A personal profile may be used when the user is outside of the business environment. The profile of the device may be changed according various factors.

14 Claims, 17 Drawing Sheets

SECURITY-BASED MESSAGE MANAGEMENT

CROSS-REFERENCE TO RELATED APPLICATION

This application claims the benefit of U.S. Provisional Patent Application No. 62/114,152, filed on Feb. 10, 2015. The subject matter of this earlier-filed application is hereby incorporated by reference in its entirety.

FIELD

The present invention pertains to message management, and more particularly, to security-based message management that determines and applies a use profile pertaining to a type of use of a user device, and determines appropriate message recipients.

BACKGROUND

Enterprises are caught in a desktop dilemma. On one hand, information technology (IT) organizations face pressures to control costs and ensure compliance, manageability, and security. On the other hand, end users increasingly require the freedom and flexibility to access their applications and data from multiple devices and locations. This desktop dilemma, which pits end-user freedom against the need for IT control, can drive up costs, impact security, and overwhelm IT resources. This dilemma is aggravated by the existing personal computer (PC)-centric computing paradigm, which is expensive to manage and restricts IT's ability to respond in an agile fashion to changing business dynamics.

To break free from this dilemma, organizations are looking for an agile, adaptive approach to computing that enables IT to balance business requirements with the needs of end users for a flexible, high-performance computer experience. Desktop virtualization with VMware Horizon View™, for example, enables organizations to do more with less and adopt a user-centric, flexible approach to computing. By decoupling applications, data, and operating system from the endpoint, and by moving these components into the datacenter where they can be centrally managed in the cloud, desktop and application virtualization offers IT a more streamlined, secure way to manage users and provide agile, on-demand desktop services. Message Security Mode allows control of all messages between the View Connection Server instances, and between the View Connection Server instances and the security servers.

The offloading of computation from mobile devices to remote cloud resources or closely located computing resources known as cloudlets has been researched. The shared devices may belong to the same household or be used by a large group of people, such as in a military or disaster scenario. In such scenarios, the incentive to collaborate on computational tasks is not an issue and the communal goal of prolonging the lifetime of the collection of devices makes sense. This incentive is further amplified if a connection to a cloud (or network) is costly, unreliable, or simply unavailable.

Research further involves the initial state of power availability in a collection of collaborative mobile devices and a set of computational tasks with known or estimated power consumption profiles on the mobile devices to determine the best approach to schedule the computation among the set of shared devices so as to maximize their lifetime.

The concept of a mobile device cloud (MDC) is derived and is determined to be a set of mobile devices functionally working together, sharing resources. Such an offloading context involves a highly collaborative context where the goal of computational offloading is to maximize the lifetime of the MDC.

Microsoft Lync Server™ is an enterprise-ready unified communications platform that builds on previous Lync Server products to connect people everywhere, on Windows machines and other devices, as part of their everyday productivity experience. Lync provides a consistent, single client experience for presence, instant messaging, voice, video and meetings.

The arrival of Microsoft's Cortana™, a digital assistant for its Windows Phone™ mobile operating system based on the voice of an intelligent computing system from the Halo™ videogame, competes directly with Apple's Siri™ and Google Now™ for the chance to organize appointments, contacts, travel arrangements, and all of the other minutiae of daily life. Microsoft™ calls Cortana™ the "truly personal digital assistant" (a thinly veiled dig at its forerunners) that analyzes how users use their phone to learn what topics they are interested in, when they are busy, and where they travel.

Cortana™ can deliver a summary of relevant news stories at the start of the day. Like a flesh-and-blood personal assistant, it also allows users to set up a "quiet time" where calls and text are silenced, as well as letting an "inner circle" of contacts break through those restrictions. The Notebook feature lets users tweak what the application knows about them, providing a more granular level of control than either Siri™ or Google Now™. In many ways, Cortana™ combines Siri's™ voice search with Google Now's™ suggestions, which are based on data like your location, the time, and your appointment calendar.

Siri™ started the digital assistant trend as an independent, stand-alone application before being acquired by Apple™ in 2010. A year later, Apple™ integrated Siri™ into iOS™ and started marketing the service as an "intelligent assistant that helps you get things done just by asking." Over time, Siri™ has become better at recognizing and interpreting commands while linking to more apps in Apple's™ ecosystem. What it doesn't have is all of the personalization and data collection found in Google Now™ and Cortana™.

Siri™ plugs into users' emails, contacts, and calendar, but is not trying to find out everything about the user. "In some ways, the approaches each company has taken in the space is a reflection on their heritage," says Tony Costa, a senior analyst for Forrester. "Google Now is much more like a search engine—efficient, task focused, and trying to anticipate what you need. Apple Siri is much more of a natural language voice user interface. And Cortana a bit of a blend of the two approaches."

Google Now™ didn't premiere until 2012, but it has rapidly become a critical feature in the company's Android™ operating system. Like Siri™, it can be activated and controlled by voice, but voice isn't front and center the same way it is in Siri™ and Cortana™. Instead, Google™ emphasizes the app's ability to predict what information users need and when. Recent searches, regular travel routes, and email messages are all scanned for information the user might want to see right away, e.g., the delivery status of an Amazon™ order, the weather, the latest news about a favorite sports team, etc. In short, Google Now™ doesn't wait for the user to ask. While users can still instruct to their phone to "send an email" or "wake me up in half an hour" as is also possible with Siri™, Google Now™ adds suggestions and recommendations based on user searches, activities, and other data. Spend every Monday evening at the gym, for example, and Google Now™ will soon learn to show directions on cue every Monday.

However, while the systems discussed above offer cloud computing and enable various functionality for offering suggestions to users and interpreting and carrying out user commands, they do not provide security-based message management based on a use profile pertaining to a type of use of a user device, nor do they determine appropriate recipients for the profile. Accordingly, an improved, security-based approach to message management that takes the type of use and appropriate recipients into account may be beneficial.

SUMMARY

Certain embodiments of the present invention may provide solutions to the problems and needs in the art that have not yet been fully identified, appreciated, or solved by current message management systems. For example, in some embodiments, Bring Your Own Device (BYOD) functionality allows a user of a client device to utilize the device in a business environment where the functionality of the device is altered to conform to the business environment, henceforth referred to as the "business profile." An alternate profile, henceforth referred to as the "personal profile," is used when the user is outside of the business environment in some embodiments. Alternatively, the profile of the device can be changed according to elements outside of the geographic location of the device in certain embodiments. For example, the device may be placed in the business profile according to the time of day, applications initiated on the device, etc., as further discussed herein. The current application may provide non-secure data when a device is in a business profile, as well as provide secure data when the device is in a personal profile.

In some embodiments, restrictions and functionalities are discussed that alter characteristics of data depending on the current profile of the device (i.e. business or personal). In certain embodiments, the current application allows for the automatic determination of the recipient(s) of a message based on characteristics of the message. More specifically, the recipient(s) of the message may be based on the subject matter of the message (such as an email, instant message, etc.), the time of day, the geographic location of the user when the message is created, an attachment to the message or in the message, a device profile (whether personal or business), etc. In some embodiments, the current application validates file attachments to a message to determine whether the attachment is valid for the chosen recipient(s) of the message.

In an embodiment, a computer-implemented method includes receiving, by a computing system, information including a plurality of factors and analyzing, by the computing system, the plurality of factors to determine a type of profile that the computing system should use. The computer-implemented method also includes putting the computing system into the determined type of profile, by the computing system, responsive to the analysis.

In another embodiment, a computer program is embodied on a non-transitory computer-readable medium. The program configured to cause at least one processor to receive information including a plurality of factors indicative of whether a client device should be in a business profile or a personal profile and analyze the plurality of factors to determine whether the client device should be in the business profile or the personal profile. The computer program is also configured to cause the at least one processor to put the client device into the determined type of profile responsive to the analysis.

In yet another embodiment, a system includes a sender client device, a recipient client device, and a server configured to communicate with the sender client device and the recipient client device. The sender client device is configured to send a validate message associated with a message to the server. The server is configured to validate the message to determine that the message is secure and send the message to the recipient client device when the message is validated.

BRIEF DESCRIPTION OF THE DRAWINGS

In order that the advantages of certain embodiments of the invention will be readily understood, a more particular description of the invention briefly described above will be rendered by reference to specific embodiments that are illustrated in the appended drawings. While it should be understood that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE EMBODIMENTS

Figure 1:
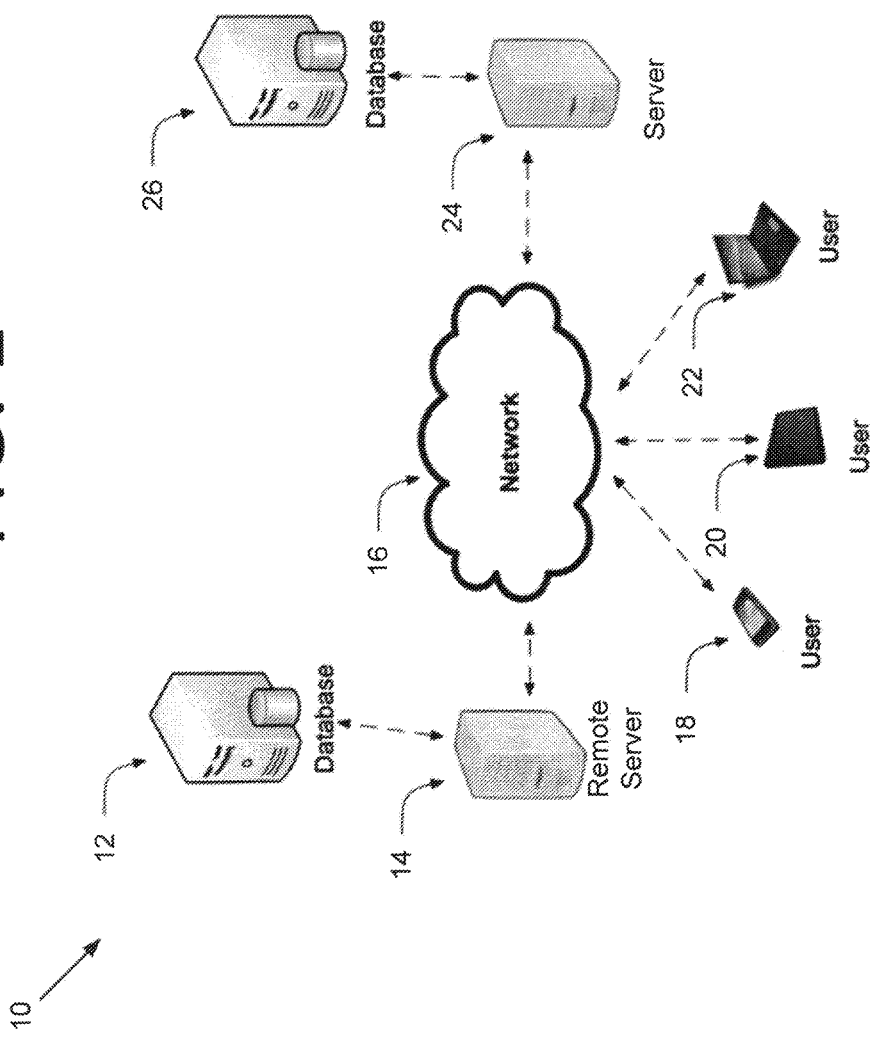
FIG. 1 is a block diagram illustrating a system, according to an embodiment of the present invention.

FIG. 1 is a block diagram illustrating a system 10, according to an embodiment of the present invention. Some embodiments, in the form of software, for example, allow a user utilizing a mobile client machine 18, a tablet computer 20, a laptop or desktop computer 22, etc. to download the software from a server 24. A client's device may also be a gaming system, a DVD player, a wearable device such as a watch, bracelet, headset, etc., an automobile interactive computer, a personal digital assistant (PDA), an MP3 player, a gaming device, or any other suitable device that may be utilized to consume media.

The user of some embodiments may interface with client device 18, 20, 22 and connect through a network 16 to server 24. Server 24 may be redundant, or be more than a single entity without deviating from the scope of the invention. A database 26 is directly connected to server 24 or connected remotely through network 16 without deviating from the scope of the invention.

A remote server 14 communicates with network 16. Remote server 14 can be redundant, or be more than a single entity, without deviating from the scope of the invention. A database 12 is directly connected to remote server 14 or connected remotely through network 16 without deviating from the scope of the invention. Database 26 can reside on server 24, or database 26 may be either directly connected to server 24 or remotely connected through network 16. Furthermore, one single database may serve both remote server 14 and server 24 in some embodiments.

In some embodiments, the BYOD application may reside completely or partially on user device 18, 20, 22. In certain embodiments, the BYOD application may reside either completely or partially on any one of the other devices in system 10 depicted in FIG. 1, e.g., server 24, database 26, remote server 14, database 12, and/or devices of network 16. If the BYOD application resides on a user device, such as user device 18, 20, 22, in some embodiments, the BYOD application may be downloaded through a suitable platform, such as an application store or marketplace, residing on the device or accessed via the device. In certain embodiments, the BYOD application may be accessed through the device's browser communicably coupled to network 16. In some embodiments, the BYOD application may be preloaded on the device. The BYOD application in some embodiments may work with any suitable user device, such as a personal computer with a touch screen, a laptop with a touch screen, a personal computing tablet, a smartphone, a PDA, or any other device with a processor, memory, and a touch screen. However, any suitable input mechanism and functionality may be used without deviating from the scope of the present invention.

Determining the Device Profile Type

Determining the profile type of the device, e.g., whether the device should use a personal profile or business profile, may occur based on a number of factors including, but not limited to, the time of day, a sender device's characteristics, a recipient device's characteristics, the geographic location of the device(s), the current configuration of the device(s), the sender of a message, the recipient of a message, the content(s) of a message, the history of the sender, the history of the recipient, the history of the message, etc. BYOD configurations of some embodiments alter the device's profile such that the device can "become" a secure device (used, for example, in an enterprise environment) and/or a personal device (used, for example, outside of an enterprise environment and/or within an enterprise environment under different conditions).

Profile-Specific Application Handling

Figure 2:
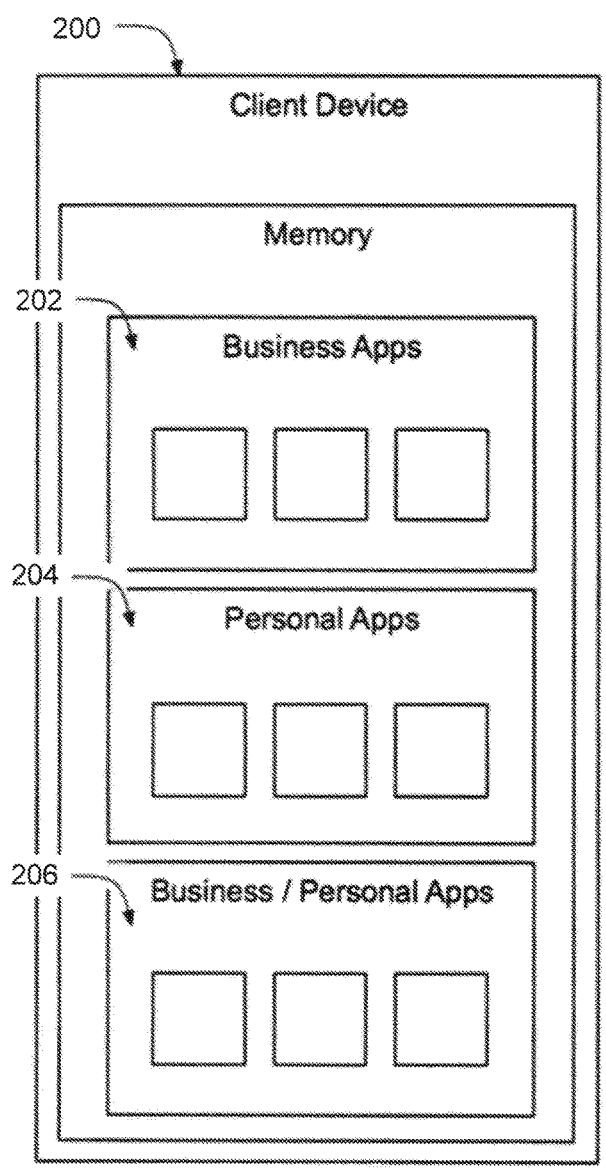
FIG. 2 is an architectural diagram illustrating an application layout of a client device, according to an embodiment of the present invention.

FIG. 2 is an architectural diagram illustrating an application layout of a client device 200, according to an embodiment of the present invention. Client device 200 includes three divisions of applications 202, 204, 206. Business applications area 202 includes the applications allowed and verified for use in the business profile. These apps may be trusted applications where the data incoming to and outgoing from client device 200 is secure and verified. Applications in this profile may include applications necessary for the user to perform work-related activities and applications to communicate in an efficient manner with co-workers, among other applications. The applications may be obtained from a trusted source, verified by the business organization.

Personal applications area 204 includes applications that are personal in nature and potentially not considered to be secure enough in nature for business purposes. These applications may be those that are normally utilized on device 200 for personal functions. The data may be personal in nature and not verified or secured by the business organization.

Combined business/personal area 206 includes applications that may be personal in nature, but also may have been verified by the organization to act as a secure application for a given amount of time, during which both incoming data to and outgoing data from the application would be verified and considered secure. The application's interactions may also help to determine the nature of the application. For example, an instant messaging application may be considered to be a secure application when the user is interfacing with a user that is considered to be inside the secure environment, and non-secure when the user is interfacing with a user that is considered to be outside the secure environment. The particulars of the incoming/outgoing data to/from the application may be a factor in considering whether the application is considered secure or non-secure.

For applications in combined business/personal area 206, it may be beneficial to differentiate between data that is considered secure and data that is not considered secure. A functional process may be established allowing the verification of incoming and outgoing data for the application(s) that are considered either secure or non-secure according to particular elements. For example, an instant messaging application, as mentioned earlier, may be considered both business and personal in nature. The difference between the two may be based on the current profile of the user and characteristics of the remote party or parties involved in the session—for example, the established domain of the remote party or parties.

Figure 3:
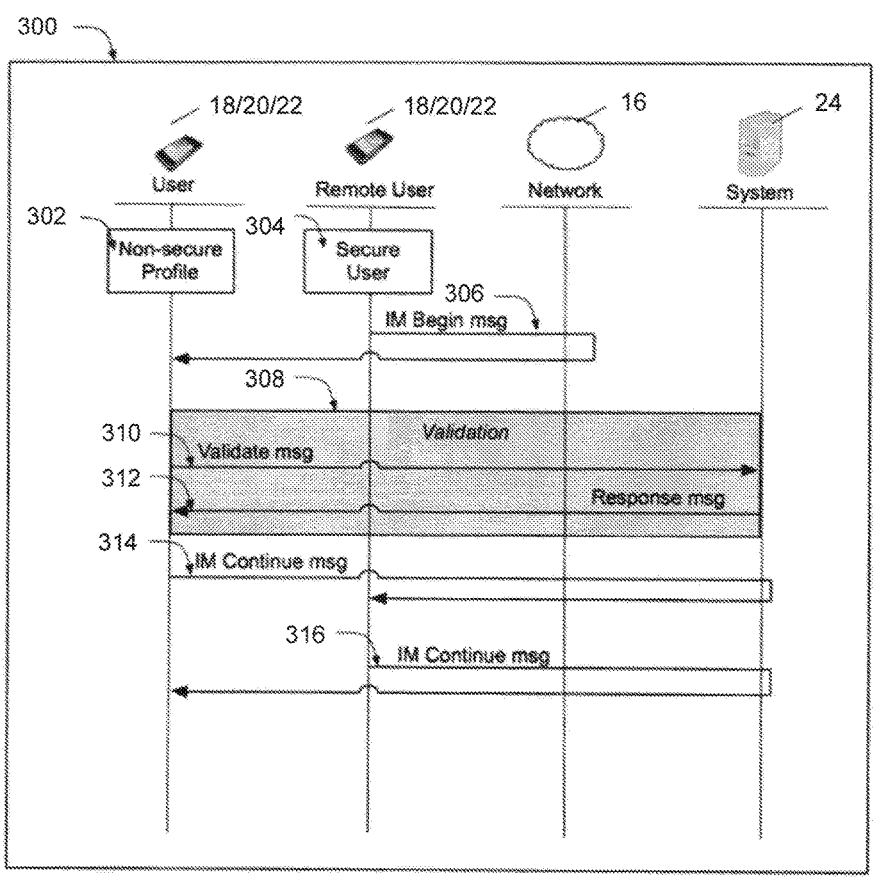
FIG. 3 is a communication flow diagram illustrating communication for instant messaging (IM) when handling secure data in a non-secure application, according to an embodiment of the present invention.

If device 200 is in a business profile, messages should be secure in nature. This allows device 200 to retain the secure profile. In some embodiments, while in the business profile (i.e., the "secure" profile), device 200 may still receive non-secure messages. This may occur if the messaging functionality is not disabled on device 200, and normal messaging continues to occur on device 200, which may originate from users that are outside of the secure environment. In this scenario, the current application may notify the user that a non-secure message is being received, and the user may signify that the communication is accepted and should be continued. The current application may then perform secure validation on the incoming message as depicted in FIG. 3. This functionality may allow the continued communication of non-secure users when device 200 is in the secure profile.

In certain embodiments, the current application may disallow the message. The user may be notified that a non-secure message was received and has been disallowed. A notification may be sent to the user from the current application, making the user aware of the incoming non-secure data. In certain embodiments, the message may be queued in the current application and automatically delivered to the user's proper application when device 200 is switched from a secure profile to a non-secure profile. In some embodiments, the user may respond to the incoming data by interacting with the notification such that a response message is sent to the sender of the non-secure data. For example, the user may send a message such as "My device is in a work-related configuration and your message will be delivered once it returns to a normal configuration."

Handling Secure Data in a Non-Secure Application

FIG. 3 is a communication flow diagram 300 illustrating communication for instant messaging (IM) when handling secure data in a non-secure application, according to an embodiment of the present invention. FIG. 3 shows a secure user interacting with a device in a non-secure profile for IM, and other types of interaction (i.e., video, email, direct messaging, voice calls, etc.) may follow the same or similar interaction in some embodiments. User device 18/20/22 is placed into a non-secure, or personal, profile 302. Remote user device 18/20/22 is considered to be a secure user 304. This may be ascertained, for example, by the email address. For instance, the email address may be determined to be one controlled and validated by a business organization or any other user that has been deemed secure by the business organization.

The remote user sends an IM message at 306 routed through network 16 to the user. Since the application receiving the message is an application that has previously been determined to interact with both secure and non-secure users, prior to interacting with the message, validation is performed to temporarily allow the IM application on the user's device to behave securely. Validation occurs at 308 between the user and system 24. This validation performs actions that verify the contents of the message, such as parsing the message, validating that the message is free from viruses, etc.

A validate message is sent to system 24 at 310 from the messaging application in the user's device containing the data as received in the message at 306, where system 16 validates the message. The message is routed through network 16 to system 24. System 24 responds back with a response message at 312 that is processed in the messaging application of the client device of the user. If the message data reflects that a secure message was received, then the process continues. If the message data reflects that a non-secure message was received, the process ends. In some embodiments, the user never sees the incoming message if it was not validated by system 24.

Assuming that the message was validated, the user continues the IM messaging by sending a response to the remote user at 314. The message is routed through network 16 and system 24 for validation as the messaging application is now considered a secure application. The remote user continues the messaging at 316, sending a message that is routed through network 16 to system 24. System 24 validates the message and routes it through network 16 to the user. The user's messaging application remains a secure application throughout the session between the user and the remote user.

If a message sent from any party in the session is sent to the system for validation and, for any reason, the message is deemed non-secure, in some embodiments, the message is not delivered and the session continues, the message is not delivered and the sender is automatically notified as to the problem that the message was not considered safe for delivery, the session is automatically cancelled and all parties are automatically notified as to the reason for the cancelled session, or the session is automatically cancelled without notification. In certain embodiments, the user's messaging application remains secure when interacting with the secure remote user, where each message is automatically routed through system 24 for validation. In some embodiments, the user's messaging application is automatically converted back to a non-secure application after a predetermined timer expires after the last message between the user and the remote user, where the amount of the timer can be configured by the user in the application, or the timer is automatically configured in the application. The timer may be a configurable number of seconds, minutes, hours, etc., or any combination thereof, in some embodiments.

Handling Non-Secure Data in a Non-Secure Application

Handling non-secure data may be an issue when the device is in a business profile or the application is considered a secure application, for example. When non-secure data, or data from a remote user that is not considered to be secure, is received in a non-secure device or application, there may be no reason for parsing the data or sending the data through another process to validate the data.

Figure 4:
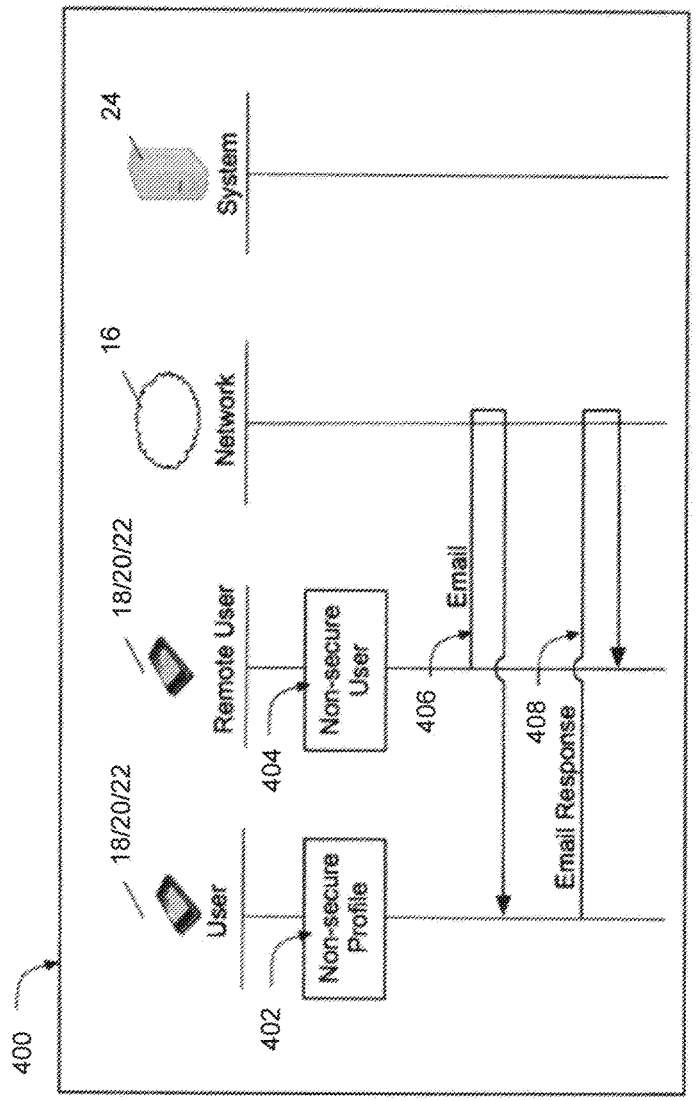
FIG. 4 is a communication flow diagram illustrating communication for email when handling non-secure data in a non-secure application, according to an embodiment of the present invention.

FIG. 4 is a communication flow diagram 400 illustrating communication for email when handling non-secure data in a non-secure application, according to an embodiment of the present invention. Depicted are two users—a user and a remote user. Both users are considered to be non-secure. The user's device is in a personal profile 402 and the remote user is considered a non-secure user 404. The remote user sends an email at 406. This message is sent to network 16 and then routed to the user. Upon receipt, the user's device processes the incoming message in a normal fashion, without the need to parse and/or validate the message for security. The message is received and the user is notified of the incoming message through normal notifications established by the device for incoming messages. The user then composes a response and sends a message with the remote user as the recipient at 408. This message is sent to network 16 and finally routed to the remote user. The message is received and the user is notified of the incoming message through normal notifications established by the device for incoming messages.

Handling Secure Data in a Secure Application

Handling secure data in a secure application may require the data that is incoming to and outgoing from the application to be verified. The sender of the data may be verified as secure, the data may be verified as secure, or both. The amount of security required may be configurable by the application in the configuration thereof.

Figure 5:
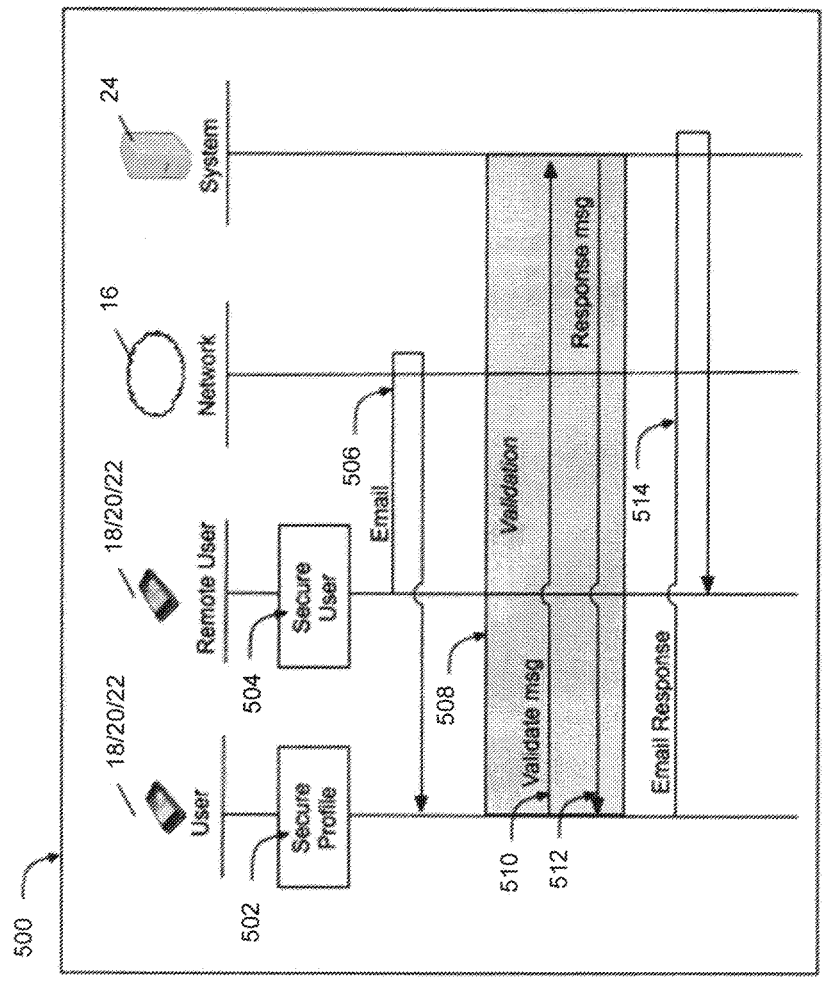
FIG. 5 is a communication flow diagram illustrating communication for email when handling secure data in a secure application, according to an embodiment of the present invention.

FIG. 5 is a communication flow diagram 500 illustrating communication for email when handling secure data in a secure application, according to an embodiment of the present invention. The user is currently in a secure profile 502, and the remote user is considered a secure user 504. The remote user sends an email with the user as a recipient at 506. The message is routed through network 16 and then on to the recipient (in this case, the user).

The message is received at the user's device at 406. Validation may be necessary since incoming messages are automatically validated in a secure profile at 508. A validate message is sent at 510 to system 24 from the messaging application in the user's device containing the data as received in the message at 506. System 24 validates the message. The message is routed through network 16 to system 24. System 24 responds back with a response message at 512 that is processed in the messaging application of the client device of the user. If the message data reflects that a secure message was received, the process continues. If the message data reflects that a non-secure message was received, the process ends. In some embodiments, the user never sees the incoming message if it was not validated by system 24.

The user then sends a response to the message (in this example, an email) at 514. The message is sent through network 16 to system 24 as messages sent from a secure profile are validated by system 24 for verification. System 24, after validating the message, sends the message to the remote user routed through network 16. The message is received by the remote user's device and the remote user is notified of an incoming message as regular protocol. In certain embodiments, system 24 validates the remote user as a secure user allowing future messaging to bypass validation where both parties in the conversation are considered secure.

Recipient Determination

In some embodiments, the most proper recipient of the composed message is automatically determined according to characteristics of the message and/or attachments to the message. There are cases, particularly in the business scenario, where a message is composed without an understanding of the best recipient for the message. In many such cases, to have the message delivered to the most proper recipient, the message may have to go through other channels and/or personnel. If an application could determine the best recipient(s) for the current message, this would greatly assist the user in expediting functionality. Determining the recipient may be performed based on the characteristics of the device or the message being generated, sent, or received. This may occur automatically or be triggered by a user of the device.

If triggered by a user, when creating a message, the application is interworked into the message application on the device such that a graphical user interface (GUI) component (for example, a button) is placed in the application (i.e. entitled: "Determine Recipient") that, when pressed, sends the contents of the message to the application (whether executing in the device or remotely) and the potential recipient(s) are returned. The different parts of the message (i.e. subject, body, attachments, etc.) can be utilized to help determine the best recipient(s).

If automatically triggered, the functionality to determine the recipient(s) may be initiated automatically by the application. Triggers may be placed programmatically in the message application of the client device (i.e., at particular points in the navigation of the components) such that the application initiates the functionality to determine the recipient(s). As an example, in the composition of an email, when the user navigates away from one or more of the text-entry components, the functionality is initiated. In an email composition, some entries are necessary and some are optional (e.g., attachments). Upon the navigation exit of a necessary component (e.g., the text entry component for the body of the email), a trigger may be placed.

A trigger may be an event that is "thrown" or functionally executed upon occurrence of a particular action. In this example, an event is thrown when the user exits the text entry component for the body of the email. In some embodiments, the application first checks whether any text was entered into the text entry component, and the event is thrown when either a predetermined or a configurable amount of text is entered into the component. The configuration of the amount of text takes place in the configuration portion of the application.

When an event is thrown, procedures in the application can register to "catch" the event. This means that an event is caught by the procedure and associated functionality in the procedure is then executed. In this example, when the user exits the text entry component, an event is thrown to the system. The procedure to execute the functionality of determining the recipient(s) catches the event and begins execution. The procedure to determine the recipient(s) may be local to the client device or may reside remotely to the client device, where messaging between the client device and the remote system is routed through the network.

Figure 6:
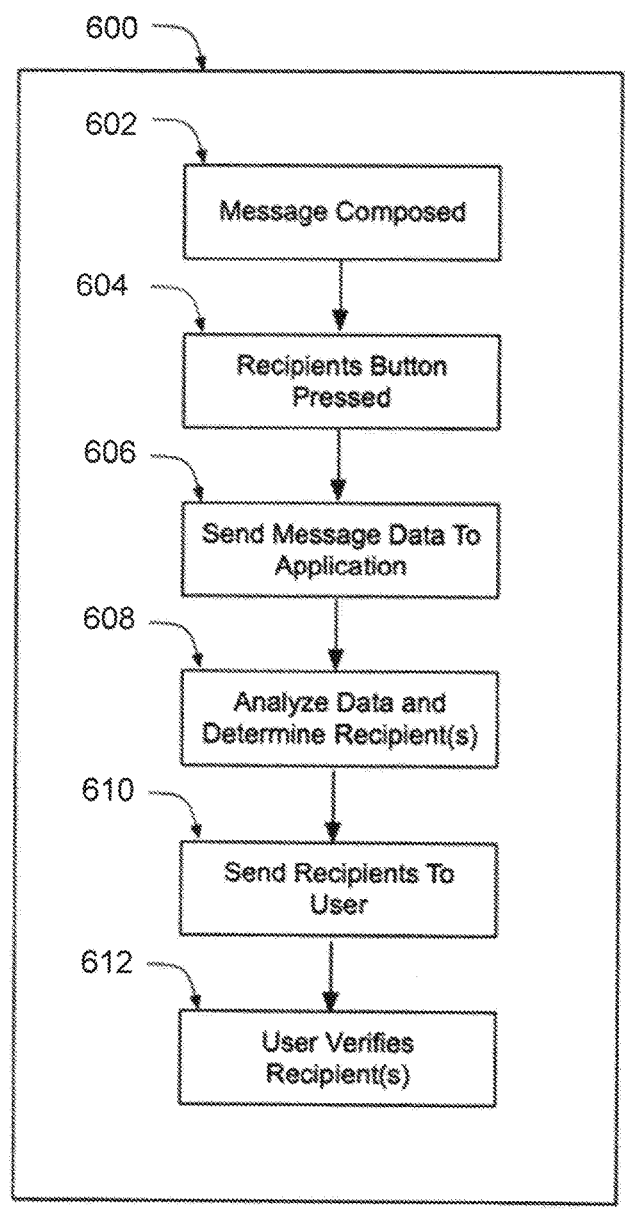
FIG. 6 is a flowchart illustrating a process for determining recipients, according to an embodiment of the present invention.

FIG. 6 is a flowchart illustrating a process 600 for determining recipients, according to an embodiment of the present invention. The user begins the process by generating a message on the client device at 602. The functionality of the current application can be interworked into a message application on the device, or a separate, new application is utilized with the functionality in the current application. Regardless, the recipient of the message is not entered, as the functionality in the current application will determine the best recipient(s) for the message.

The user presses a button that initiates the functionality to determine the recipient(s) of the generated message at 604. In some embodiments, the application can automatically determine the recipient(s) once the message is generated or the user can initiate the functionality to determine recipients via component on the display of the device. The application sends the contents of the message (e.g., subject, body, attachments, etc.) to the system at 606. This message is routed through the network to the system. In certain embodiments, the functionality to determine the recipient(s) can reside in the client device, or another remote processor communicably coupled to the network. If the functionality is inside the client device, internal messaging may allow for the functionality to determine the recipient(s).

The system receives the message contents and begins to analyze and determine the recipient(s) of the message at 608. A recipients message is sent at 610 to the client device with the recipient(s) determined by the system. This message is routed through the network to the client device.

Finally, the user is able to validate the determined recipient(s) at the client device at 612. This may be presented to the user as a popup box or any other method utilized to display notifications on the client device. The user has the option to accept, reject, and/or add additional recipient(s) to the list. Once the recipient(s) are validated at 612, the recipient(s) are added to the generated message and the user has the option to send the message, edit the message wherein the recipients can be modified, delete the message, etc.

Figure 7:
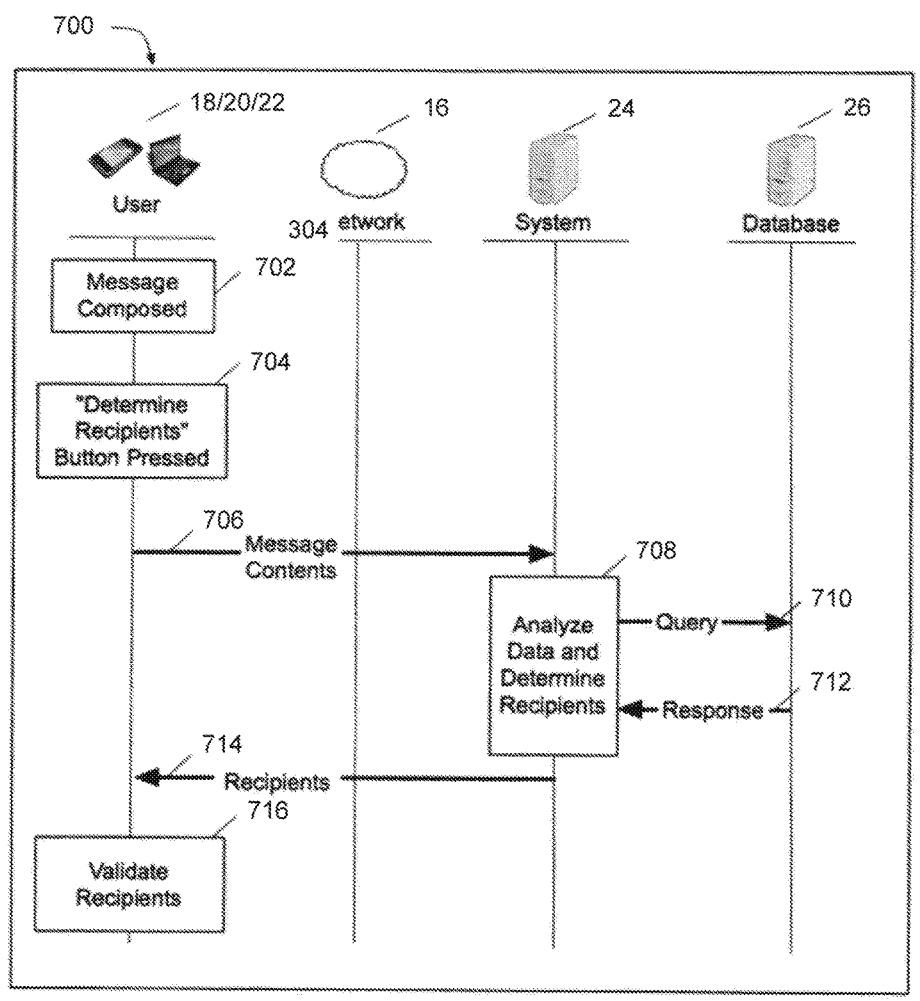
FIG. 7 is a communication flow diagram illustrating communications for determining recipients, according to an embodiment of the present invention.

FIG. 7 is a communication flow diagram 700 illustrating communications for determining recipients, according to an embodiment of the present invention. The user begins the process by generating a message at 702 on client device 18/20/22. The functionality of the current application can be interworked into a message application on the device, or a separate, new application is utilized with the functionality in the current application. In any case, the recipient of the message is not entered, as the functionality in the current application will determine the best recipient(s) for the message. The application can automatically determine the recipient(s) once the message is generated or the user can initiate the functionality to determine recipients via a button on the display of the device.

The user presses a button that initiates the functionality to determine the recipient(s) of the generated message at 704. The application sends the contents of the message (including all aspects of the message, i.e. subject, body, attachments, etc.) to system 24 at 706. This message is routed through network 16 to system 24. In some embodiments, the functionality to determine the recipient(s) can reside in client device 18/20/22, or another remote processor communicably coupled to network 16.

System 24 receives the message contents and begins to analyze and determine the recipient(s) of the message at 708. System 24 may interwork with a database 26 to obtain additional information (for example, the contacts of the user). A query message 710 is sent to database 26 and a response message 712 is returned with the results of the query message. A recipients message is sent to client device 18/20/22 at 714 with the recipient(s) determined by system 24. This message is routed through network 16 to client device 18/20/22.

Finally, the user is able to validate the determined recipient(s) at the client device at 716. This may be presented to the user as a popup box or any other method utilized to display notifications on the client device. The user has the option to accept, reject, and/or add additional recipient(s) to the list. Once the recipient(s) are validated at 716, the recipient(s) are added to the generated message and the user has the option to send the message, edit the message wherein the recipients can be modified, delete the message, etc.

Figure 8:
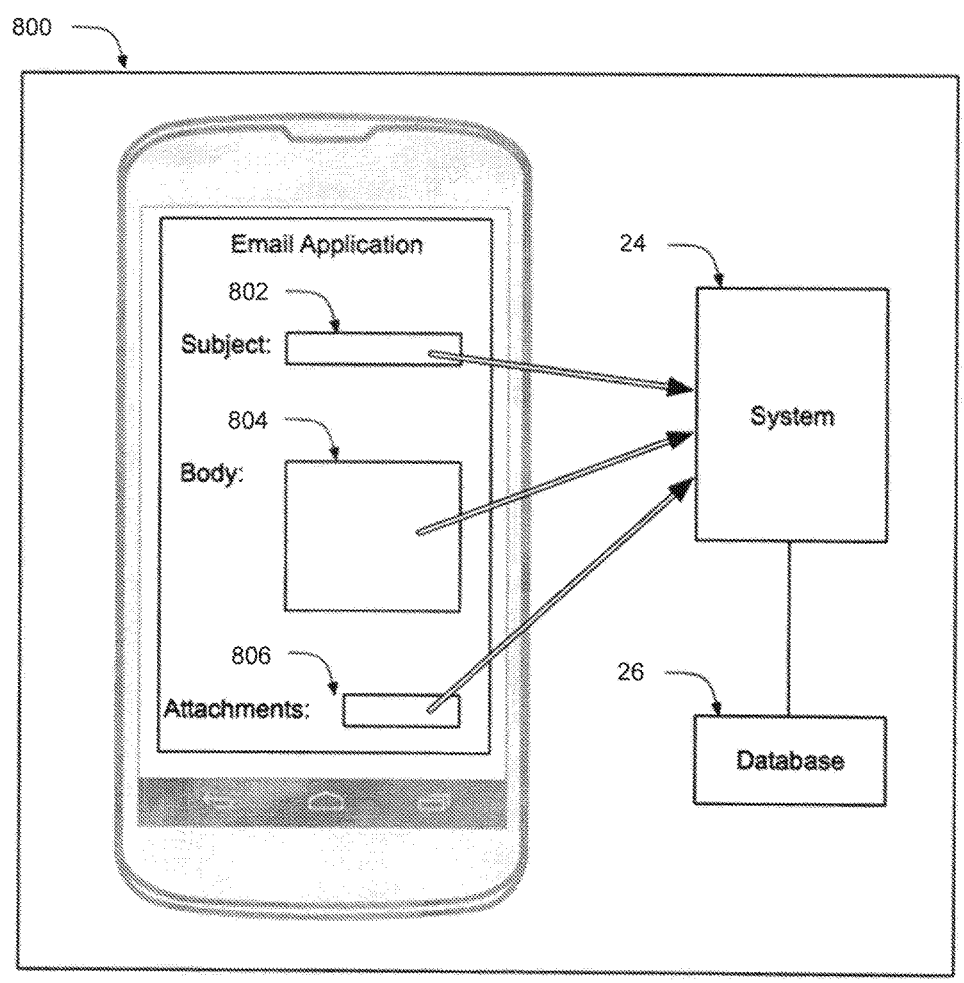
FIG. 8 is an architectural diagram illustrating a client device interacting with the system, according to an embodiment of the present invention.

FIG. 8 is an architectural diagram illustrating a client device 800 interacting with system 24, according to an embodiment of the present invention. Also residing in the architecture is a communicably coupled database 26. The database may also be remotely located and communicate with system 24 via a network, for example, the Internet. Client device 800 displays an email application and serves to depict the overall functionality of components on the display when the messaging application is executing on client device 800. In this example, the message application is an email program.

A subject component 802 allows the user to enter a subject of the message. A body 804 allows the user to input the body of the message. An attachment component 806 allows the user to attach files to the message. The actual interface/component may be different than depicted in FIG. 8 as this figure is merely intended to be illustrative.

As depicted in FIG. 8, the contents of components 802, 804, 806 are delivered to system 24 and database 26 also may be queried. The contents of the message in components 802, 804, 806 are sent to system 24 for analysis to determine the appropriate recipient(s) of the message. The elements in the message may be used in the analysis.

For example, subject 802 is parsed and compared with any previous messages that may have been sent by the user. If the subject contains words and/or phrases that match previous messages, then the recipient(s) are used to determine the recipient(s) of the current message. Body 804 of the message is parsed by system 24 and keywords are analyzed. For instance, the keywords may be compared against previously sent messages from the user. If a match is made, the recipient(s) of that message may be used as the recipient(s) of the current message.

In some embodiments, the keywords in the body are compared to words/phrases pertaining to business entities in the organization. For example, keywords such as "legal," "litigation," "patent," "law suit," etc. would signify that the legal department is a proper recipient of the message. More specifically, the business contacts within the legal department may be the proper recipient(s) of the message.

In certain embodiments, a relationship is made in system 24 where each business entity is related to both keywords pertaining to that business entity and business contacts within that business entity. Some example relationships of each business entity in the organization with the keywords that pertain to that entity followed by the business contact emails within that entity are shown below in Table 1.

TABLE 1

EXAMPLE BUSINESS ENTITY RELATIONSHIPS

| Business Entity | Keywords | Contacts |
| --- | --- | --- |
| Legal | legal, litigation, patent, law suit | jbarnes@eym.com msulley@eym.com |
| Marketing | marketing, market, advertising, advertising budget, launch, slogan | msmith@eym.com |

The contacts may be elements other than email addresses. For example, the relationship table may contain telephone numbers such that the recipient may be a number allowing for instant messages, or a telephone number allowing the user to place a call to that recipient. Other entities may be present in the table that reflect all of the different entities in the organization, as well as many other keywords reflecting the nature of each of the listed entities. The relationship table may exist in system 24, in client device 18/20/22, or in any other element in the architecture containing a processor and memory where communication between client device 18/20/22 and the relationship table is through either interprocess communication or external communication through a network such as the Internet.

Figure 9:
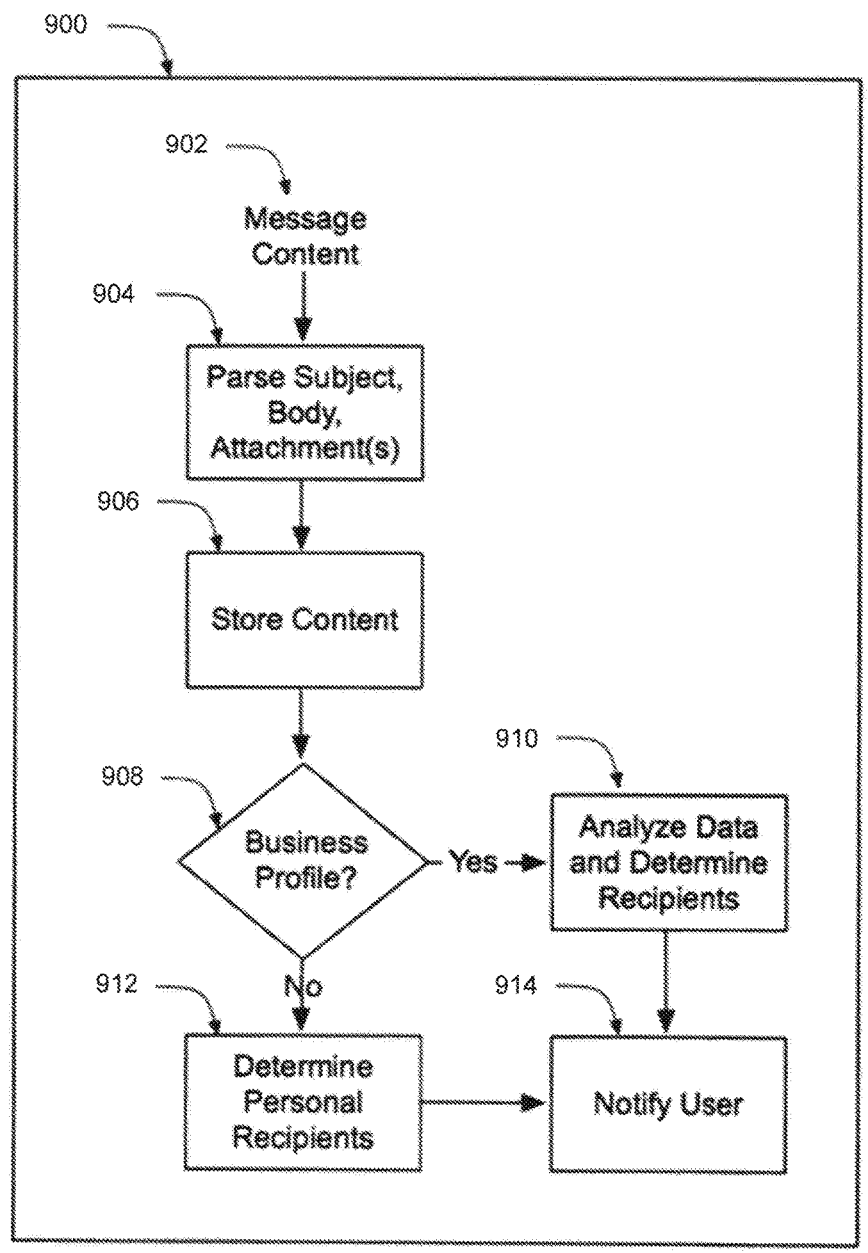
FIG. 9 is a flowchart illustrating a process for determining recipients, according to an embodiment of the present invention.

FIG. 9 is a flowchart 900 illustrating a process for determining recipients, according to an embodiment of the present invention. The email contents are analyzed and recipients are determined based on whether the device is in the personal profile or the business profile. The message is composed at the client device and sent to the application residing either inside or outside the device at 902. If the application resides inside the device, then internal messaging is used to send the contents for analysis. If the application resides outside the device, then the message is sent to the application through a data network, for example, the Internet.

The contents of the message are parsed and keywords are extracted from all parts of the message. In the case of attachments, the name of the attachment is used, or the actual attachment is scanned and content is determined and added to the analysis data at 904. The content of the parsing and processing of the message content is stored at 906 either locally or in a remote database either communicably coupled to the application or remotely through a data network such as the Internet.

A determination of the profile is made on the device at 908. This can be functionally determined by examining the device's state variable located either inside or outside of the device, for example. If the profile of the device reflects a business profile, the parsed data (e.g., keywords) is compared against relationship tables to determine any business entities that could be considered recipients of the message at 910. If the profile of the device reflects a personal profile, the parsed data (e.g., keywords) is compared against the user's personal data at 912. This personal data may include, but is not limited to, stored contacts and previous correspondence, previously received emails, previous sent emails, instant messages, stored voicemails, social network historical data, etc. The parsed keywords are compared against the data available at either the user's device or made available by querying an external server and/or database at 910/912. Connection data (for example cell numbers, email addresses, and/or other types of connection) is sent to the user as message and displayed on the user client device at 914.

Figure 10:
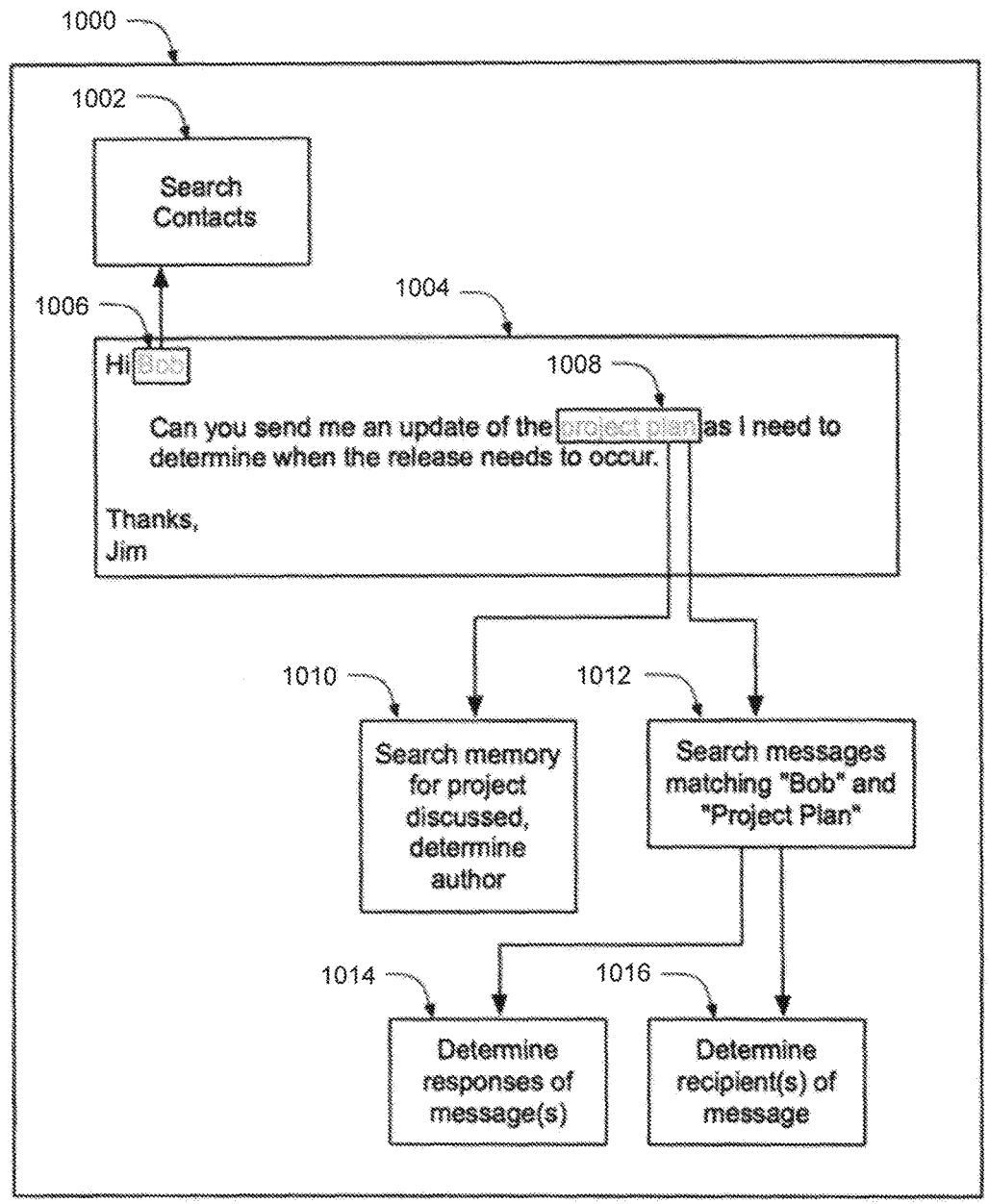
FIG. 10 is a flowchart illustrating a process for analyzing a recipient using a message and possible keywords, according to an embodiment of the present invention.

FIG. 10 is a flowchart 1000 illustrating a process for analyzing a recipient using a message and possible keywords, according to an embodiment of the present invention. The email contains two keywords 1006 and 1008 that may help determine the proper recipient. Assuming that the device is in the business profile, first keyword 1006 is sought. The application searches contacts with the name "Bob", "Bobby" or "Robert" then determines whether any of those contacts have had recent interactions with the user at 1002. A contact is encountered when searching previous emails correspondence of the user. The email address is: "robertfolds@eym.com". The application further assumes that this is a business contact as the domain of the email address "eym.com" is the same domain as the user.

In some embodiments, all parts of the message may be examined, and it is possible to determine the type of user, such as business or personal. For example, a business contact may be assumed if the body of the text in the message includes keyword(s) reflecting a business correspondence, the attachment(s) to the message pertains to a business correspondence, the time of day when the message was sent, the Internet Protocol (IP) address of where the message was sent to/from, etc. It may further be determined that the user has had interaction with robertfolds@eym.com and the correspondence contains the "project plan" keyword. This raises the probability that the contact should possibly be the recipient of the message.

Second keyword 1008 is first searched to determine whether any recent messages have been sent and/or received with the same keyword in any part of the message at 1010. If a message is determined, the author of the message and all parties in the message are determined as possible recipients of the message. Messages are searched and the two combined keywords 1006, 1008 are sought at 1012. If a message is encountered, then the recipients of the messages are pulled as possible recipient(s) of the message at 1016. All further messages (or all responses) are then determined, where the sender(s) and/or recipient(s) may be utilized as possible recipients of the message, at 1014.

Figure 11:
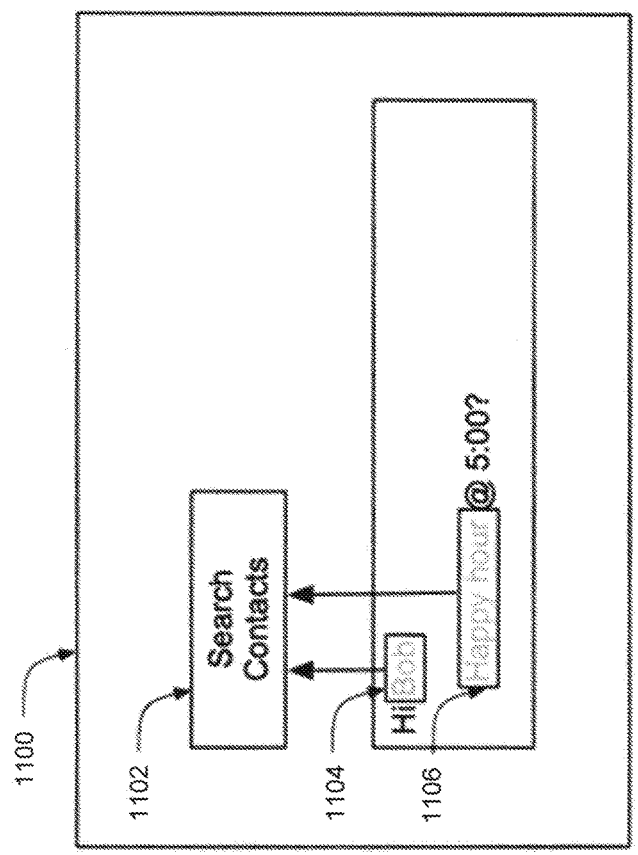
FIG. 11 illustrates a message on a device with a personal profile active, according to an embodiment of the present invention.

FIG. 11 illustrates a message 1100 on a device with a personal profile active, according to an embodiment of the present invention. Message 1100 is parsed and two keywords 1154, 1156 are discovered. Keywords 1154, 1156 are used in searching a user's contacts 1152.

In some embodiments, keywords are stored in a list in the system or any other element in the network. This list of keywords assists the application in determining the nature of the message. For example, keywords such as "drink," "party," "bar," "eating," "game," "sports," etc. would generally be considered to be related to a personal message. The keyword "happy hour" is determined and compared against the list of keywords. As such, the message is related to a personal message as that keyword is matched in the list of personal keywords.

In addition, the user's previous messages (for example instant messages, SMS messages, emails, social networks, etc.) are searched for matching keywords. The messages and applications are interacted with through published application programming interfaces (APIs), for example. Once recipient(s) are located, a notification is made on the device, and the user is able to verify the recipients or the message is automatically sent out with the determined recipient.

Message Processing with Sensitive Information

In some embodiments, an incoming message is determined to originate from either a secure or non-secure entity by a number of functional methods discussed herein. In certain embodiments, the content of the message is examined to assist in determining the sender's security credentials. For example, two users may work at the same company where they are exchanging text messages. The messages may be automatically monitored by a system such as is located in the business remote data, henceforth referred to as the monitoring system in this example. The messages may be automatically sent to the business remote data through the data network.

Figure 12:
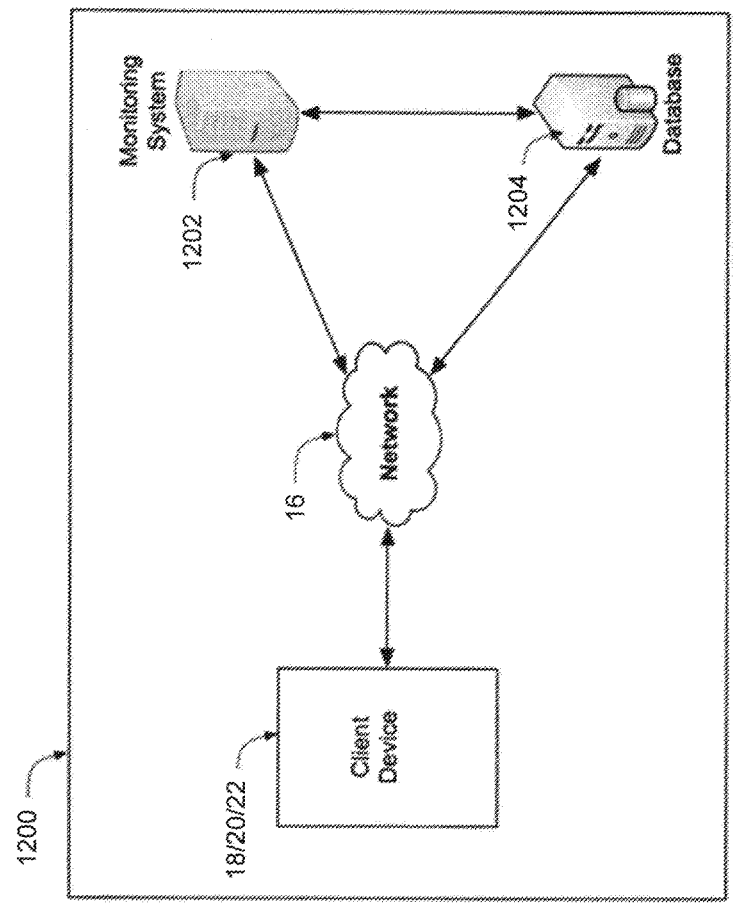
FIG. 12 is an architectural diagram illustrating a system including a monitoring system, according to an embodiment of the present invention.

FIG. 12 is an architectural diagram illustrating a system 1200 including a monitoring system 1202, according to an embodiment of the present invention. Monitoring system 1202 parses messages for content that may be secure in nature, and provides alternative actions based on whether the message is forwarded to the recipient or rejected, as well as the notification of actions taken to the originator of the message. Messages sent from a client device 18/20/22 in the form of email, text messages, voicemails, etc. are routed to monitoring system 1202 through network 16 prior to being routed to the recipient(s).

Monitoring system 1202 is communicably coupled to a database 1204, which may contain employee data such as the employee's security clearance, current project, etc. Database 1204 may be part of the human resources database, or may be the human resources database in some embodiments. The interaction with database 1204 allows monitoring system 1202 to validate the content of the messages with the current security level and current projects of the recipient(s) of the messages. Monitoring system 1202 is also aware through the project data of hidden or secret projects that are not published by the organization.

In an example, User A sends the following text message to User B: "I can't make the 1:00 because I'm working on a project Mars deliverable." The message is automatically sent to monitoring system 1202, where the message is parsed. Monitoring system 1202 determines through the interaction with the project data that User B is not on project "Mars" and that the project is a high profile and secret project in the organization. Therefore, the text message is altered to remove the sensitive data such as: "I can't make the 1:00 because I'm working on a deliverable," "I can't make the 1:00 because I'm working," "I can't make the 1:00," etc.

Figure 13:
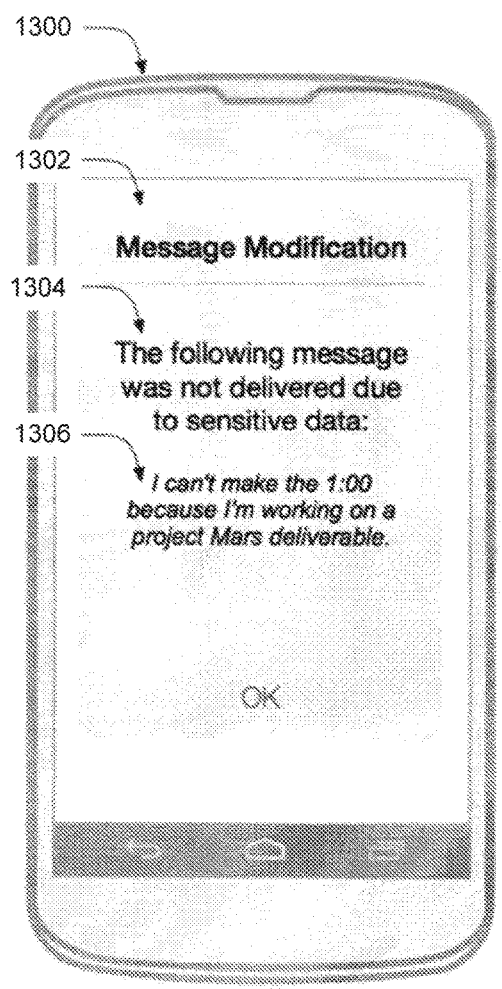
FIG. 13 is a front view illustrating a client device, according to an embodiment of the present invention.

In some embodiments, User A's text message is not delivered and a notification is sent to User A, such as that depicted in client device 1300 of FIG. 13. In FIG. 13, a notification 1302 is presented on client device 1300 from a notification message sent from the system, for example, the monitoring system. The message is routed through the network to client device 1300. The monitoring system sends a notification message 1304 when, due to sensitive data in the user's message, it deems that the original message is undeliverable.

Heading text is presented at the top of the notification, "Message Modification" and provides an indication as the reason for notification 1302. The text of notification message 1304 is a description of the actions that caused notification 1302. In this example, the message sent from the user is undeliverable due to sensitive information included therein. A copy of the message 1306 is included in notification 1302, allowing the user to completely understand what message pertains to notification 1302. Finally, a button entitled "OK" is included in notification 1302 that, when pressed, dismisses notification 1302.

In some embodiments, the sensitive text in the message is indicated by highlighting, changing the type (i.e., bold type), changing the color, etc. In certain embodiments, when the system, for example, the monitoring system, encounters text in a message of a sensitive nature, the text is removed and the message is forwarded to the recipient. In addition, a warning notification is sent to the originator of the message indicating that sensitive text was included in a message, which was removed. The message is delivered without the sensitive text.

Restricting Secure Attachments

In some embodiments, some actions of a user of the client device 18/20/22 are monitored by the application. The application interacts with the email application either directly or through APIs to verify that the actions are proper when the device is placed in a business or secure profile. The application monitors the user's actions and communicates with the monitoring system to validate the actions and provide corrective actions to the user when necessary.

Figure 14:
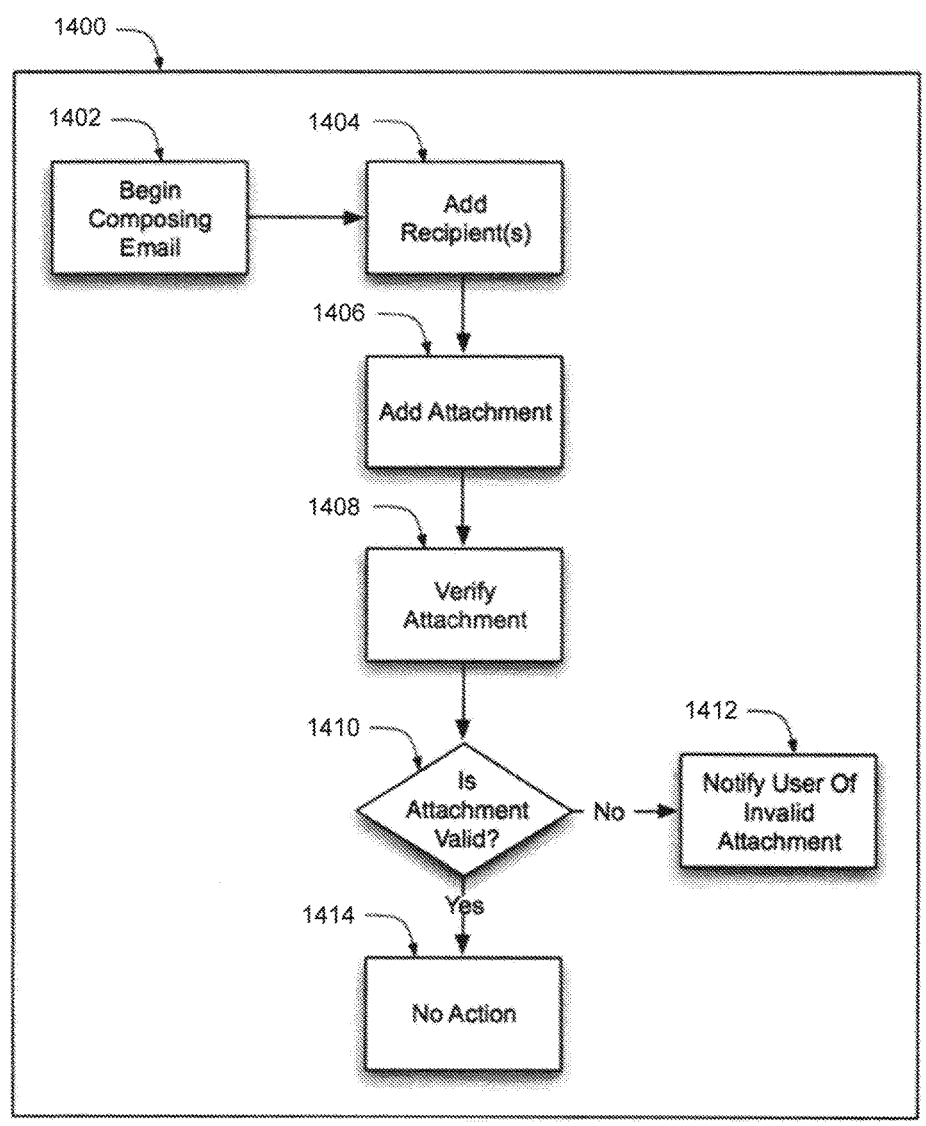
FIG. 14 is a flowchart illustrating a process for validating a flowchart, according to an embodiment of the present invention.

FIG. 14 is a flowchart 1400 illustrating a process for validating a flowchart, according to an embodiment of the present invention. The user, on the client device, begins the process of composing an email at 1402 using an email application on the device. The user adds recipient(s) to the email at 1404. The user may then add text in the body of the email or skip the body of the message.

The user then chooses to add a file attachment or attachments to the email 1406 where a file or files is/are either dragged into the email application on the device, the user chooses an attachment button, or any other method used to add an attachment or attachments to an email is employed. An event is thrown when the file(s) is/are attached to the email application when the user drags a file or files over the email application or when a file or files is/are chosen from a file chooser component.

The event is caught by the current application and the attachment is verified at 1408. A response is received indicating the validation of the attachment. If the attachment is validated at 1410, the process ends at 1414. If the attachment is not validated at 1410, the user is notified of the invalidation by a notification at 1412.

In some embodiments, once the current application sends a message to validate the attachment, the user is unable to send the message before a response is provided in return. The send functionality is modified in the email application to disallow the user from sending the email before the attachment is validated. This may be accomplished by changing the properties of a component on the GUI of the email application such as making a "send" button non-clickable or any other method used to disallow an action.

If the response to the validation indicates that the attachment is valid, then the functionality to disallow the user in sending the email is reversed and the user is then able to send the email. If the response to the validation indicates that the attachment is invalid, then a notification is displayed to the user via the GUI of the current application and the reason for the validation is seen. In certain embodiments, if a determined or predetermined timeout occurs, the user is sent a notification indicating that validation of the attachment has not occurred and the message in its current state is unable to be verified.

Figure 15:
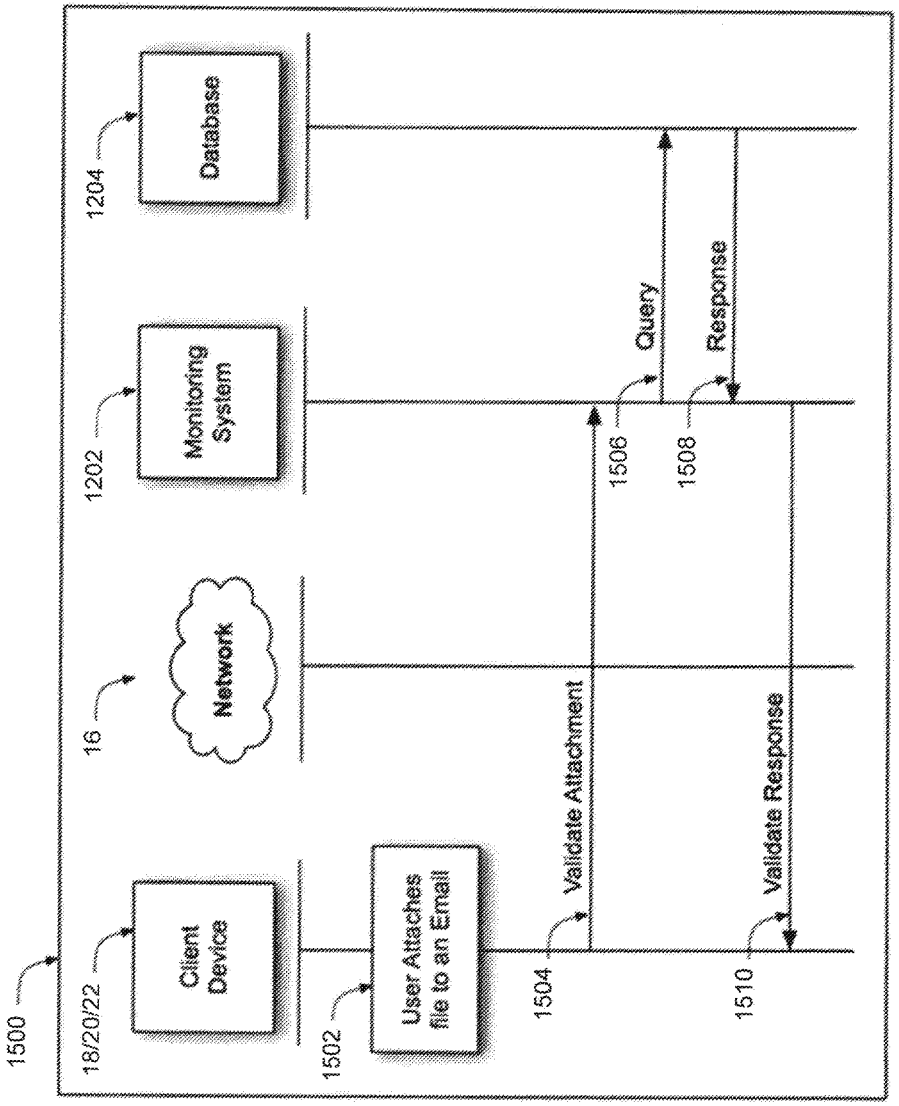
FIG. 15 is a communication flow diagram illustrating a message flow for verifying an attachment, according to an embodiment of the present invention.

FIG. 15 is a communication flow diagram 1500 illustrating a message flow for verifying an attachment where a file attachment to a message (for example, an email) is validated prior to the user sending the message, according to an embodiment of the present invention. Using an email application, the user attaches a file to an email being composed at 1502. This action throws an event wherein a validate attachment message 1504 is sent to monitoring system 1202 routed through network 16. Validate attachment message 1504 may contain the main elements of the users (both the originator and the recipient(s)), such as their name, email addresses, phone numbers, etc., and the main elements of the file(s) that are being attached such as file name, file contents, location of the file, application(s) associated with the file type, etc.

Monitoring system 1202, interworking with database 1204, determines whether the attachment violates security. This functionality compares the security and project assignments of the attachment(s) with the security and project assignments of the recipient(s) at 1506/1508. Monitoring system 1202 responds with a validate response message at 1510 to client device 18, 20, 22 containing a reason code signifying the results of the validation.

Figure 16:
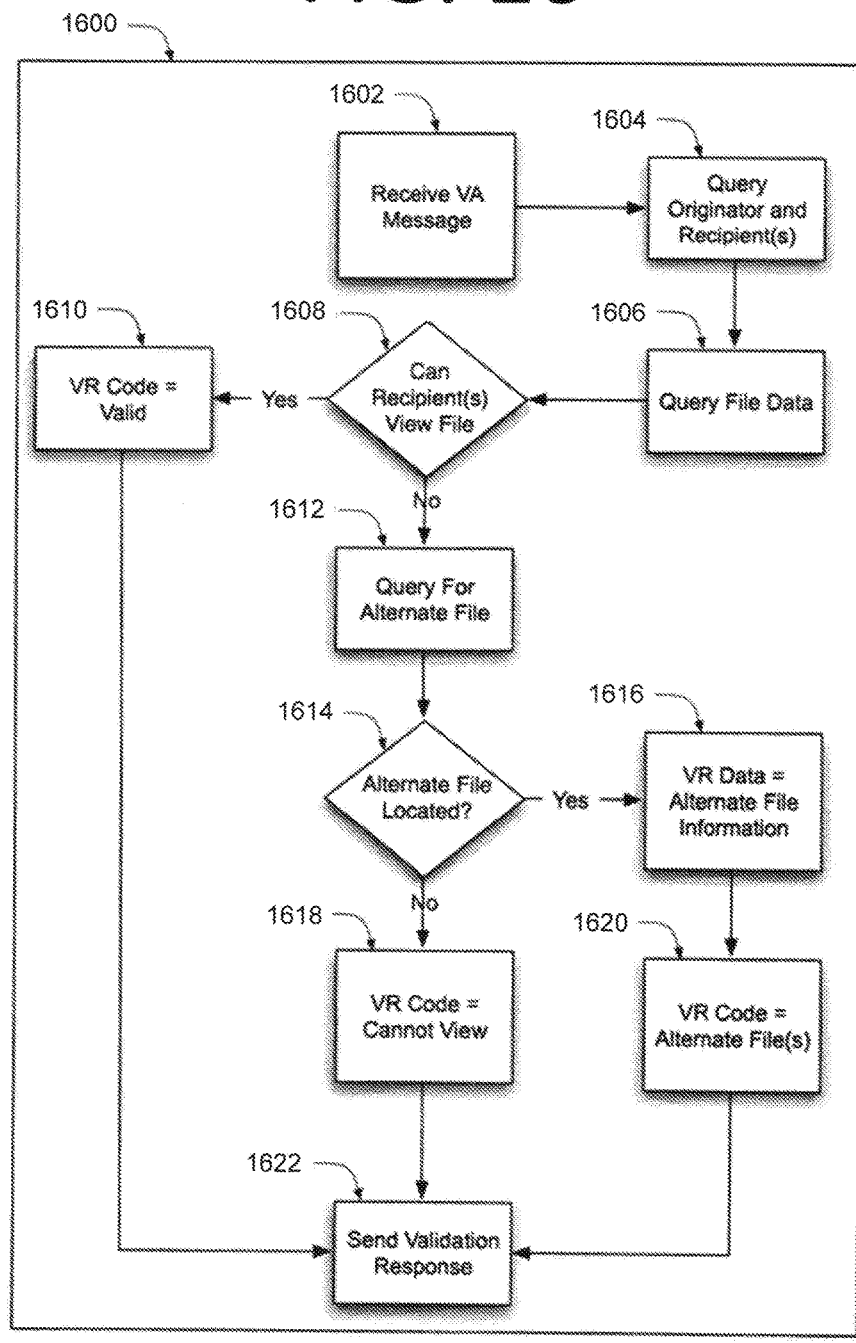
FIG. 16 is a flowchart illustrating a process for verifying an attachment, according to an embodiment of the present invention.

FIG. 16 is a flowchart 1600 illustrating a process for verifying an attachment, according to an embodiment of the present invention. A validation attachment message is received at 1602 by the monitoring system. The validation message contains the data related to the originator of the message, the recipient(s) of the message, and the attachment(s).

The database is queried at 1604 to obtain any additional information on the originator and recipients of the message. This additional information may contain the projects that the originator and recipients are currently involved with. The database is further queried at 1606 to obtain any additional information on the file attachment(s). This additional information may contain project details related to the file attachment(s) based on the file name of the attachment(s), the file contents of the attachment(s), the file type of the attachment(s), etc.

A determination is made as to whether the recipient(s) of the message are able to view the file attachment(s) at 1608. This functionality may include whether the security clearance of the project associated with the attachment(s) higher than the security clearance of the recipient(s), whether the privacy of the project associated with the attachment(s) includes the recipient(s), whether the type of file is viewable by the recipient(s), etc. If the recipient(s) are able to view the file at 1608, the validation response message code is set to a value indicating "valid". The validation response message is sent at 1622 if valid.

If the recipient(s) are not able to view the file at 1608, the monitoring system queries the database for possible alternate file(s) where the privacy and security of the alternate file(s) is/are valid for the recipient(s) of the message at 1612. If an alternate file or files is/are located at 1614, the data associated with the alternate file(s) (i.e. the alternate file location(s), the file name(s), etc.) is/are set to alternate file information at 1616 and added to the data of the verification response message at 1620. In some embodiments, the actual files are added to the data of the validation response message. If alternate file(s) is/are not located at 1614, then the validation response message code is set to a value indicating "cannot view" at 1618. The validation Response message is then sent at 1620.

Figure 17:
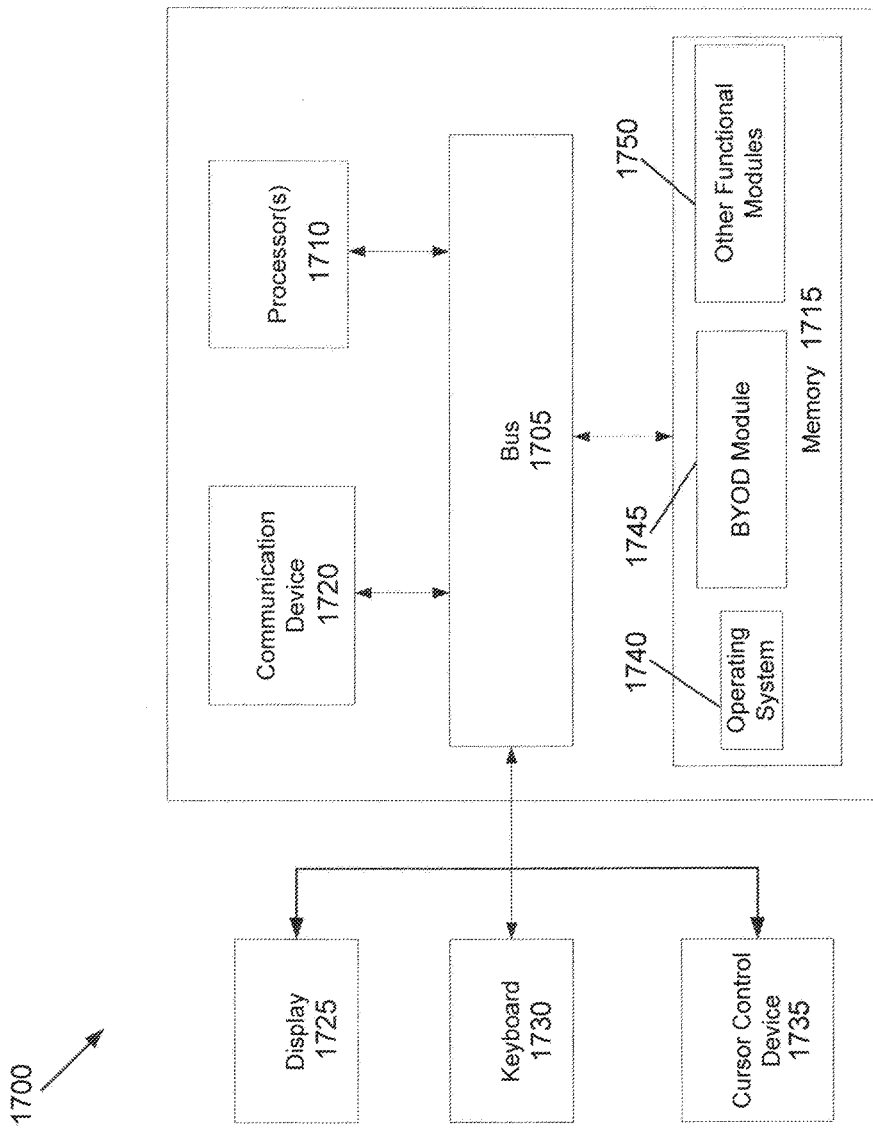
FIG. 17 is a block diagram illustrating a computing system 1700, according to an embodiment of the present invention.

FIG. 17 is a block diagram illustrating a computing system 1700, according to an embodiment of the present invention. Computing system 1700 includes a bus 1705 or other communication mechanism configured to communicate information, and at least one processor 1710, coupled to bus 1705, configured to process information. At least one processor 1710 can be any type of general or specific purpose processor. Computing system 1700 also includes memory 1720 configured to store information and instructions to be executed by at least one processor 1710. Memory 1720 can be comprised of any combination of random access memory ("RAM"), read only memory ("ROM"), static storage such as a magnetic or optical disk, or any other type of computer readable medium. Computing system 1700 also includes a communication device 1715, such as a network interface card, configured to provide access to a network.

The computer readable medium may be any available media that can be accessed by at least one processor 1710. The computer readable medium may include both volatile and nonvolatile medium, removable and non-removable media, and communication media. The communication media may include computer readable instructions, data structures, program modules, or other data and may include any information delivery media.

At least one processor 1710 is coupled via bus 1705 to a display 1725, such as a Liquid Crystal Display ("LCD"). Display 1725 may display information to the user. An input device 1730 is also coupled to bus 1705 to enable the user to interface with computing system 1700.

Memory 1720 stores software modules that provide functionality when executed by at least one processor 1710. The modules include an operating system 1740 and a BYOD module 1745, as well as other functional modules 1750. Operating system 1740 provides operating system functionality for computing system 1700.

One skilled in the art will appreciate that a "system" could be embodied as a personal computer, a server, a console, a personal digital assistant (PDA), a cell phone, a tablet computing device, or any other suitable computing device, or combination of devices. Presenting the above-described functions as being performed by a "system" is not intended to limit the scope of the present invention in any way, but is intended to provide one example of many embodiments of the present invention. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together, but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

It will be readily understood that the components of various embodiments of the present invention, as generally described and illustrated in the figures herein, may be arranged and designed in a wide variety of different configurations. Thus, the detailed description of the embodiments, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, reference throughout this specification to "certain embodiments," "some embodiments," or similar language means that a particular feature, structure, or characteristic described in connection with the embodiment is included in at least one embodiment of the present invention. Thus, appearances of the phrases "in certain embodiments," "in some embodiment," "in other embodiments," or similar language throughout this specification do not necessarily all refer to the same group of embodiments and the described features, structures, or characteristics may be combined in any suitable manner in one or more embodiments.

It should be noted that reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

The invention claimed is:

1. A computer-implemented method, comprising:
   receiving, by a computing system, information including a plurality of factors;
   analyzing, by the computing system, the plurality of factors to determine a type of profile to utilize with the computing system; and
   utilizing the determined type of profile, by the computing system, responsive to analysis;
   wherein a validate message associated with a message is sent, by the computing system, to a server;
   wherein the message is validated, by the server, to determine that the message is secure; and
   wherein the message is sent to a recipient, by the server, when the message is validated
   wherein a messaging application is converted, by the computing system, back to a non-secure messaging application when a predetermined timer expires after a last message between the sender and the recipient;
   wherein the type of profile comprises a business profile or a personal profile;
   wherein the business profile is a secure profile and the personal profile is a non-secure profile;
   wherein the messaging application in the secure profile is configured to be used with business users and the messaging application in the non-secure profile is configured to be used with non-business users.

2. The computer-implemented method of claim 1, wherein the plurality of factors comprise a time of day, a sender device's characteristics, a recipient device's characteristics, a geographic location of the sender device, the recipient device, or both, a current configuration of the sender device, the recipient device, or both, a sender of a message, a recipient of the message, content(s) of the message, a history of a sender, a history of the recipient, a history of the message, or any combination thereof.

3. The computer-implemented method of claim 1, wherein the analyzing of the plurality of factors further comprises determining which of these two profiles to utilize with the computing system.

4. The computer-implemented method of claim 1, further comprising:
   placing, by the computing system, applications allowed and verified for use in the business profile in a business applications area; and
   placing, by the computing system, other applications that are not allowed and verified for use in the business profile in a personal applications area.

5. The computer-implemented method of claim 4, wherein applications in the business profile area are obtained from a trusted source that is verified by a business organization.

6. The computer-implemented method of claim 1, further comprising:
   placing, by the computing system, applications that are personal in nature, that have been verified for use in the business profile, in a combined business/personal applications area.

7. The computer-implemented method of claim 1, further comprising:
   not sending the message to the recipient, by the computing system, when the message is not validated.

8. The computer-implemented method of claim 1, further comprising:
   notifying the sender, by the server, when the message is not validated.

9. The computer-implemented method of claim 1, wherein the message comprises email, an instant message (IM), or a text message.

10. A computer program embodied on a non-transitory computer-readable medium, the program configured to cause at least one processor to:
    receive information including a plurality of factors indicative of whether a client device includes a business profile or a personal profile;
    analyze the plurality of factors to determine whether the client device includes the business profile or the personal profile; and
    put the client device into the determined type of profile responsive to the analysis;
    wherein a messaging application of the client device is converted back to a non-secure messaging application when a predetermined timer expires after a last message between the sender and the recipient;
    wherein the type of profile comprises a business profile or a personal profile;
    wherein the business profile is a secure profile and the personal profile is a non-secure profile;
    wherein the messaging application in the secure profile is configured to be used with business users and the messaging application in the non-secure profile is configured to be used with non-business users.

11. The computer program of claim 10, wherein the plurality of factors comprise a time of day, a sender device's characteristics, a recipient device's characteristics, a geographic location of the sender device, the recipient device, or both, a current configuration of the sender device, the recipient device, or both, a sender of a message, a recipient of the message, content(s) of the message, a history of a sender, a history of the recipient, a history of the message, or any combination thereof.

12. The computer program of claim 10, wherein the program is further configured to cause the at least one processor to:
    place applications allowed and verified for use in the business profile in a business applications area of the client device; and
    place other applications that are not allowed and verified for use in the business profile in a personal applications area of the client device.

13. The computer program of claim 10, wherein the program is further configured to cause the at least one processor to:
    place applications that are personal in nature, but have also been allowed and verified for use in the business profile, in a combined business/personal applications area of the client device.

14. A system, comprising:
a sender client device with hardware processor;
a recipient client device with hardware processor; and
a server configured to communicate with the sender client device and the recipient client device, wherein
the sender client device is configured to:
send a validate message associated with a message to the server, and the server is configured to:
validate the message to determine that the message is secure, and
send the message to the recipient client device when the message is validated;
wherein the sender client device is further configured to convert a messaging application back to a non-secure messaging application when a predetermined timer expires after a last message between the sender client device and the recipient client device;
wherein the type of profile comprises a business profile or a personal profile;
wherein the business profile is a secure profile and the personal profile is a non-secure profile;
wherein the messaging application in the secure profile is configured to be used with business users and the messaging application in the non-secure profile is configured to be used with non-business users.

* * * * *